Figure 1:
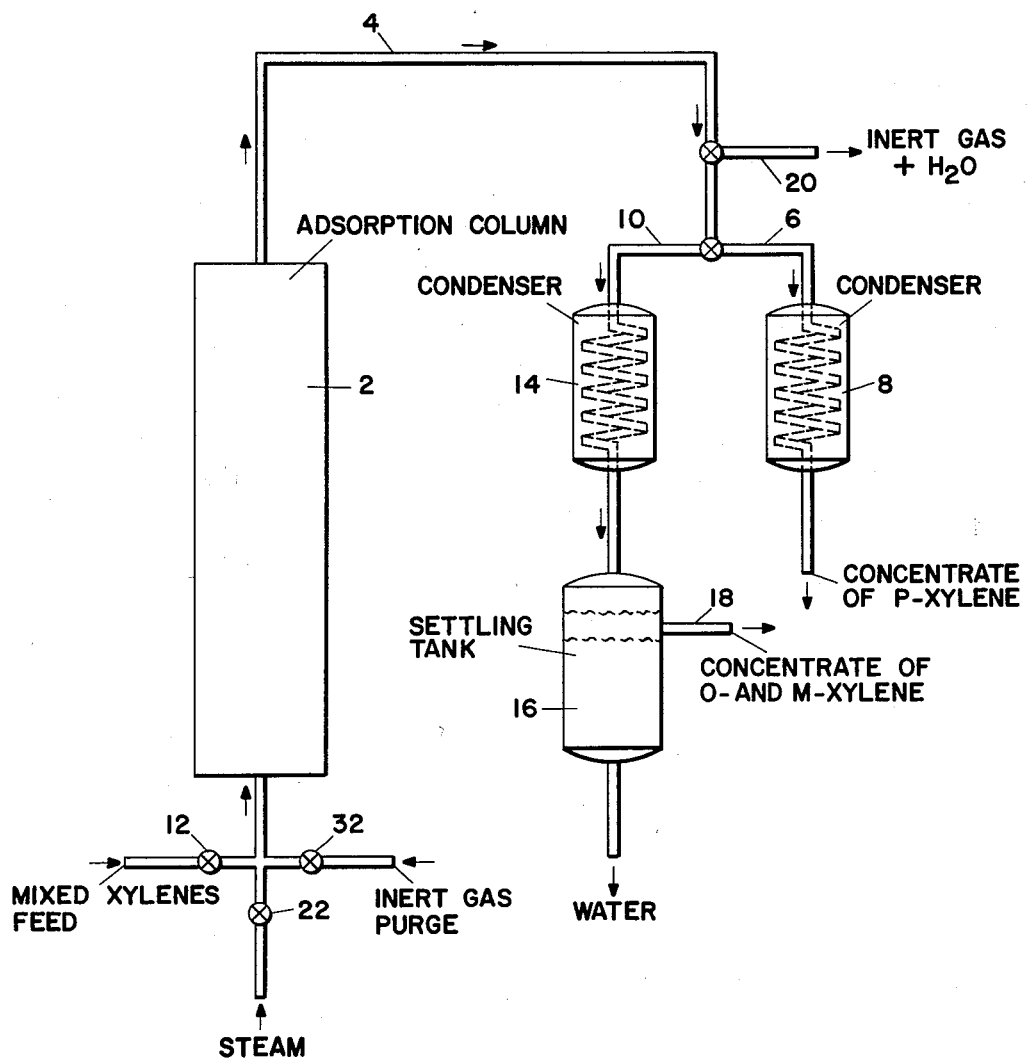

Paul E. Eberly, Jr.
William F. Arey, Jr.   Inventors

Ca FORM 13A MOLECULAR SIEVE TREAT OF A $C_8$ AROMATIC MIXTURE

TEMPERATURE: 306°F.; PRESSURE: ATM.; 1" X 3 1/2' COLUMN

Paul E. Eberly, Jr.
William F. Arey, Jr.   Inventors

United States Patent Office 3,126,425
Patented Mar. 24, 1964

3,126,425
SEPARATION OF PARA-XYLENE
Paul Earl Eberly, Jr., and William Floyd Arey, Jr., Baton Rouge, La., assignors to Esso Research and Engineering Company, a corporation of Delaware
Filed Nov. 5, 1957, Ser. No. 694,606
24 Claims. (Cl. 260—674)

The present invention relates to a process for separating hydrocarbons from their mixtures with one another, and more particularly, to the separation of hydrocarbons which are difficult to separate by distillation because of their similarity of boiling points or their azeotroping characteristics. Still more particularly, the present invention relates to the separation of close boiling aromatic isomers from their mixtures by the use of certain natural or synthetic crystalline zeolites having pore openings of uniform diameter of about 6 to 15 angstrom units.

It has long been known that certain porous substances, such as silica gel, activated char, and indeed zeolites have certain selective adsorption characteristics useful in resolving a hydrocarbon mixture into its components. Thus, silica gel is selective in removing aromatic hydrocarbons from non-aromatic hydrocarbons, and activated chars are useful in separating olefins from mixtures with paraffins. Similarly, certain crystalline zeolites having pore openings of about 5 angstroms, and known as molecular sieves, have the capacity of adsorbing and thus separating straight-chain from branched-chain and cyclic hydrocarbons. The mineral chabasite is such a zeolite; branched chain hydrocarbons have a molecular diameter greater than 5 angstroms and are thus unable to get into the pores.[1]

There are many separations, however, that these porous adsorbents are not capable of making efficiently. For instance, it would be highly desirable to separate the close boiling aromatic hydrocarbons, particularly the xylenes, which occur in petroleum streams. Para-xylene in particular is desired in the highest state of purity possible. It is an intermediate in the manufacture of terephthalic acid, which is subsequently employed in the manufacture of synthetic fibers such as "nylon" and "Dacron." Small amounts of impurities, such as the isomeric xylenes, provide an unsatisfactory product. Up to the present, this problem of contamination of para-xylene streams with close boiling aromatic isomers, such as ethylbenzene, m-xylene and o-xylene, has been solved by the costly process of cooling the $C_8$ aromatic mixture to a sufficiently low temperature to crystallize out the p-xylene from the solution. The para-xylene is then separated by filtration carried out at temperatures below 56° F., i.e. its freezing point. Several crystallizations are often required to produce the p-xylene in a sufficiently high degree of purity; such a procedure requires expensive refrigeration.

It is, thus, an object of the present invention to provide a highly efficient process for separating an aromatic hydrocarbon in a high degree of purity from a mixture of its isomers without the necessity of such costly procedures as multistage refrigeration or superfractionation.

Other and further objects and advantages of the present invention will become more clear hereinafter.

In accordance with the present invention there is employed as a selective aromatic hydrocarbon separation agent a metal salt of a crystalline alumino-silicate having pore openings of uniform size, of from about 6 to 15 angstroms, preferably of from about 10 to 13 angstroms. These materials may readily be prepared by mixing and heating sodium aluminate and sodium silicate, preferably sodium metasilicate under carefully controlled conditions of temperature, concentration, and alkalinity, to produce a crystalline product which is subsequently dehydrated under conditions to preserve the crystalline structure. If desired, the sodium content of the alumino-silicate may thereafter be replaced at least in part by effecting ion exchange with an appropriate divalent metal salt, such as magnesium, calcium, zinc, barium, strontium, cadmium, and the like. The base exchange is not necessary; however, exchange with group II metals, such as calcium, generally gives a more effective adsorbent for the separation of aromatic isomers such as the xylenes.

The preparation of the zeolite involves the maintenance of several critical steps. These are (1) the ratio of soda to silica, (2) the reaction temperature, (3) the pH of the solution from which the sodium alumino-silicate is crystallized, and (4) the ratio of silica to alumina. Unless these critical conditions are observed, the resulting composition will either not be crystalline, or it will have little or no adsorptive properties, the pores will not be uniform, or the pores, if uniform, will be too small to admit any but small diameter molecules. If the conditions are observed, the pores will be large enough to admit most organic molecules, and will be between 6 and 15 angstroms.

The ratio of $Na_2O/SiO_2$ in the silicate employed must be at least 0.5/1, but may be as high as 2/1. Preferably, the ratio is 0.7/1 to 1/1, and the desired reagent is sodium metasilicate. If water glass is employed, additional caustic must be present.

The composition of the sodium aluminate is less critical. Sodium aluminates having any ratio of soda to alumina in the range of 1/1 to 3/1 may be employed; however, a sodium aluminate having a high ratio of soda to alumina is preferred, and a sodium aluminate having the ratio of about 1.5/1 $Na_2O/Al_2O_3$ is particularly desirable. The amounts of sodium silicate solution and sodium aluminate solutions are such that the mol ratio of silica to alumina in the final mixture is at least 2.2/1, and preferably 2.5–4/1. However, silica to alumina ratios as high as 10/1 may be employed.

The method of mixing the sodium metasilicate and sodium aluminate solutions must be carried out in a manner allowing formation of a precipitate having a uniform composition. A good method is to add the aluminate to the silicate at ambient temperatures using rapid and efficient agitation to make a homogeneous paste. Thereafter, the mixture is heated to about 180° to 215° F. for a period up to 200 hours or more to ensure crystallization in the form having interstices large enough to adsorb iso-paraffinic and aromatic molecules. The heat-soaking step is essential; however, heating at temperatures of about 350° F. and higher does not produce a crystalline composition having the desired uniform size pore openings.

A general scheme for preparing the crystalline alumino-silicate adsorbent is as follows: A solution of sodium metasilicate is prepared, having a concentration of 30 to 300 grams, preferably 100 to 200 grams per liter. Similarly, a solution of sodium aluminate having an $Al_2O_3$ concentration of 40 to 400 grams, preferably 200 to 300 grams per liter, is prepared. The amounts of metasilicate and aluminate solutions employed are such that the ratio of $SiO_2/Al_2O_3$ in the final mixture is 2.2/1 to 10/1, preferably 2.5/1 to 4/1. The solutions are mixed, preferably at ambient temperatures. The slurry is of such concentration that the pH is above 12. Considering the amount of sodium atoms present in the total composite, the total volume of slurry should be adjusted so that each liter of composite slurry contains about 2 to 6 equivalents of sodium, preferably about 3 to 5 equivalents of sodium. The resulting slurry is heated from 180° to 250° F., but below 300° F., for a period of time depending on the temperature. At 210° F., this is about 3 to 24 hours,

[1] An article by R. M. Barrer, "Molecular Sieve Action of Solids," appearing in Quarterly Reviews, vol. III, pages 293–320 (1949) and published by the Chemical Society (London), describes these materials well.

and shorter at higher temperatures, although long heating times may be employed without producing any deleterious effects.

If desired, the crystalline product resulting from the heat-treating step may be reacted with the salt of a metal of the type previously enumerated, though the sodium form itself may be employed. In the latter case, the crystalline material is water-washed, filtered, and heat activated by calcination at 400° to 1000° F., preferably about 700° to 900° F. The crystalline sodium aluminosilicate formed during the heat soaking period has the stoichiometric composition of $Na_2O.Al_2O_3.2.7SiO_2$. The sodium crystals may be reacted with metal salt solutions that enhance the selective adsorptive behavior under certain circumstances. These metals are of the type already enumerated, and may further include cobalt, nickel, copper, silver, and groups I and II metals.

The process of the present invention may be more clearly understood when read in conjunction with FIGURE 1 which is a flow plan of a preferred embodiment of the invention. Turning now to the figure, a mixture of isomeric xylenes is fed to the adsorption column 2 by opening valve 12. The feed mixture may contain any percentage of p-xylene; however, because of economic considerations, it may be feasible to process only streams containing 50% or more p-xylene because of the limited capacity of the sieve. This will be discussed in more detail hereinafter. The adsorption should take place at temperatures above the normal boiling point of the feed mixture, preferably in the range of 292° to 650° F. The most desirable range, however, is between 300° and 400° F. The effluent from the column consisting of concentrate of p-xylene is carried through lines 4 and 6, and is condensed from the vapor to liquid phase in the water-jacketed condenser 8, and is subsequently taken off as liquid product. This process is continued until the crystalline alumino-silicate loses its adsorptive capacity. The capacity of an adsorbent depends not only on the adsorption temperature but also on the composition of the feed stream and the desired composition of the product stream. For instance, in an experiment conducted at 306° F., the capacity of a calcium-exchanged crystalline alumino-silicate was such that 1.13 gallons of over 98.7% pure p-xylene could be produced per 100 lbs. of adsorbent when treating a feed consisting of 90.9% p-xylene, 5.1% m-xylene, 4.0% o-xylene. When the adsorbent loses its capacity, valve 12 is shut off. The hydrocarbon is then desorbed from the crystalline alumino-silicate by passing steam through valve 22 into column 2 under the same conditions as those employed for the adsorption cycle. The desorbed hydrocarbon and some water vapor pass through lines 4 and 10 and are condensed from the vapor to liquid phase in a water-jacketed condenser 14. The resulting product is collected in settling tank 16 and the hydrocarbon layer, consisting of a concentrate of o- and m-xylene, is drawn off through line 18. The crystalline alumino-silicate is subsequently dried with an inert gas such as nitrogen at a temperature not less than that used for desorption and preferably at about 400° F. This inert purge stream enters the column through valve 32 and flows through lines 4 and 20 and then is vented to the atmosphere. The column is now ready for the second adsorption cycle.

The process of the present invention may be further illustrated by the specific examples below.

EXAMPLE 1

In order to compare the effectiveness of various adsorbents for separating binary aromatic mixtures, the quantity known as the alpha value or adsorption coefficient was determined. The alpha value for a binary mixture is the ratio of the composition of the adsorbed phase to that of the unadsorbed phase at equilibrium and is defined by the following equation, $$\alpha = \frac{(\text{percent A}/\text{percent B})^a}{(\text{percent A}/\text{percent B})^v}$$

where A and B represent the two components, A being the preferentially adsorbed compound. The superscripts, $a$ and $v$, refer to the adsorbed phase and the unadsorbed vapor phase, respectively. If the alpha value is unity, no separation of the two compounds can be achieved; and correspondingly, the higher the value of alpha, the greater the ease of separation.

Figure 2:
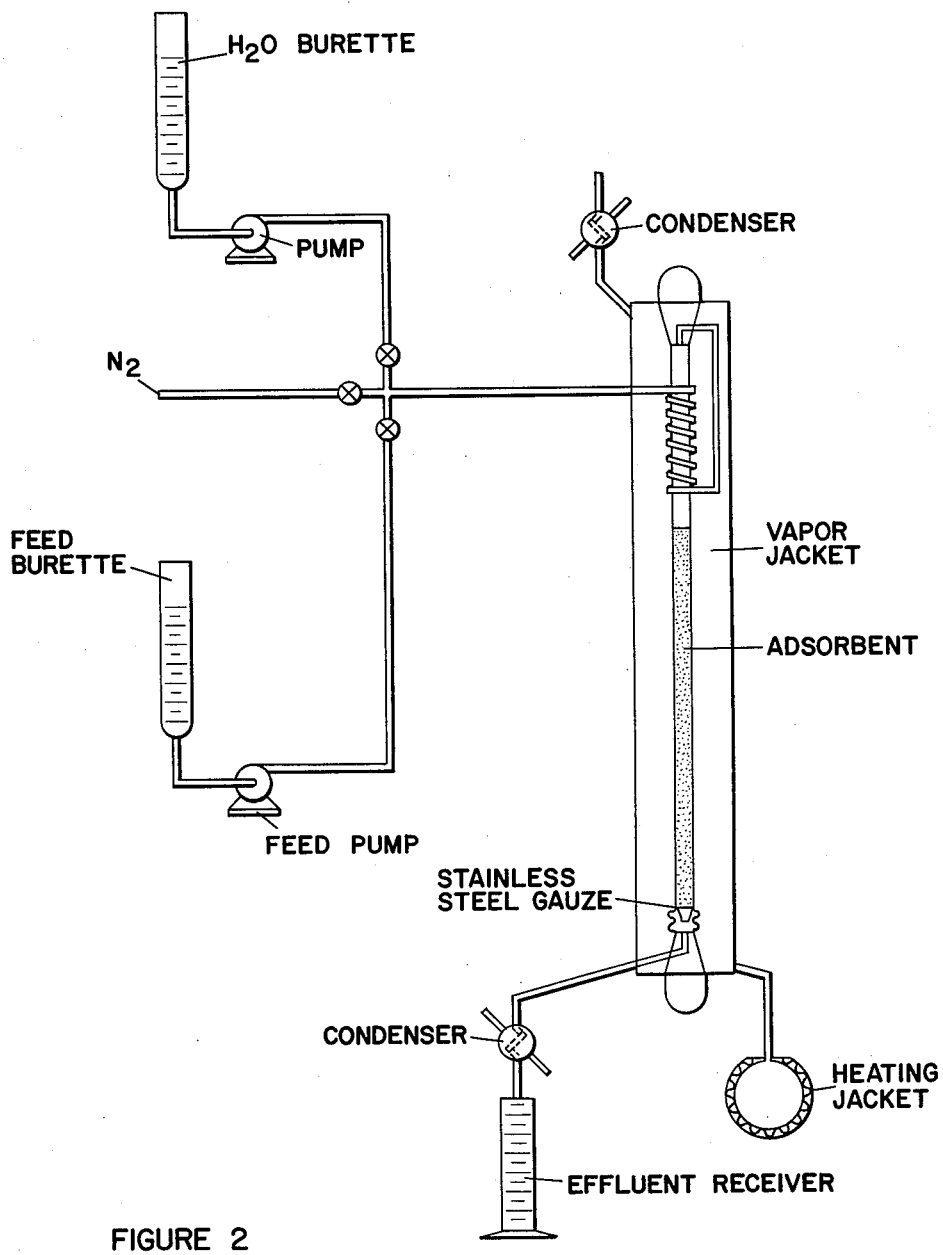

The adsorption column shown in FIGURE 2 was used to determine the alpha values. The column consisted of a 46 inch long "Pyrex" glass tube, having an inside diameter of 15 mm. This adsorption tube, in turn, was surrounded by a glass column which served as a vapor jacket for maintaining a constant temperature. The temperature (306° F.) of adsorption and desorption was obtained by refluxing cumene at atmospheric pressure through the vapor jacket. The feed in the vapor phase was passed over the fixed-bed of adsorbent (100 cc.) until the effluent had the same composition as the feed. This showed that equilibrium had been reached. The flow of feed was then stopped and the remaining unadsorbed vapor in the bed was flushed out by a slow stream of nitrogen. The material physically adsorbed on the solid was subsequently desorbed by steam at a temperature of 306° F.

TABLE I.—SEPARATION OF $C_8$ AROMATICS BY MOLECULAR SIEVE ADSORPTION AT ATMOSPHERIC PRESSURE

| Test No. | Adsorbent | Temp. of Adsorption, °F. | Feed Composition | | Alpha Value [1] |
|---|---|---|---|---|---|
| | | | A | B | |
| 24 | 13 A.-Calcium form | 306 | 50% m-xylene | 50% p-xylene | 2.32 |
| 30 | Silica gel (Davison) | 306 | ----do---- | ----do---- | 1.04 |
| | Distillation at Atmospheric Pressure [2] | | ----do---- | ----do---- | 1.02 |
| 25 | 13 A.-Calcium form | 306 | 50% o-xylene | ----do---- | 2.00 |
| 29 | 13 A.-Pellets | 306 | ----do---- | ----do---- | 1.39 |
| | Distillation at Atmospheric Pressure [2] | 306 | ----do---- | ----do---- | 1.18 |
| 28 | 13 A.-Calcium form | 306 | 50% m-xylene | 50% o-xylene | 1.23 |
| | Distillation at Atmospheric Pressure [2] | | ----do---- | ----do---- | 1.15 |

[1] Alpha $(\alpha) = \frac{\text{Percent } A \text{ (adsorbed)} \times \text{Percent } B \text{ (vapor)}}{\text{Percent } B \text{ (adsorbed)} \times \text{Percent } A \text{ (vapor)}}$, where A is the preferentially adsorbed compound.

[2] Calculated from vapor pressures by assuming the mixture to be an ideal solution.

The significance of the alpha values can best be understood by relating them to the number of theoretical stages of separation required to produce, from a binary mixture, one of the components in a given degree of purity. This relationship is expressed in the following equation, $$\log\left(\frac{\text{percent B}}{\text{percent A}}\right)_{\text{Product effluent}} - \log\left(\frac{\text{percent B}}{\text{percent A}}\right)_{\text{Feed}} = n \log \alpha$$

The equation can be derived from a thermodynamic consideration of the process of fractionation by assuming alpha to be constant over the entire range of feed composition. The number of theoretical plates, $n$, can be thought of as analogous to the number of theoretical plates in a distillation column. From this equation, it is evident that the number of theoretical stages of separation increases exponentially as the alpha value approaches unity.

Studies were made using various adsorbents on equimolal mixtures of m-xylene and p-xylene, o-xylene and p-xylene, m-xylene and o-xylene. Table I shows the results. With all three mixtures, the calcium-exchanged form of the 13 A. molecular sieve has a much greater separating power than any of the other adsorbents tested. For instance, with the m-xylene and p-xylene mixture, the calcium form 13 A. gives a remarkable separation (alpha value=2.32) when it is considered that the compounds boil only 1.4° F. apart. The alpha values for this mixture, obtained both by silica gel adsorption and by distillation at atmospheric pressure, are only slightly different from unity. The advantage in using the calcium form 13 A. is shown clearly by the results obtained with the o-xylene and p-xylene mixture. In this case the calcium form yields an alpha of 2.00 whereas the conventional sodium forms yields a value of only 1.39. Both of these, however, are higher than those for distillation at atmospheric pressure.

In the above cases, the p-xylene was the least adsorbable compound and from the data it is expected that p-xylene can be separated rather easily from a mixture of its close boiling xylene isomers by selective adsorption on the calcium form 13 A. molecular sieve. The example below clearly illustrates the separation.

*Example 2*

A synthetic mixture was made up to consist of 90.9% p-xylene, 5.1% m-xylene and 4.0% o-xylene. This mixture was fed at the rate of 60 ml. per hour to a heated column, 1 inch in diameter and approximately 3½ feet long, and containing 318 grams of calcium-exchanged 13 A. molecular sieve. The experiment was conducted at atmospheric pressure and 306° F. The effluent from the column was collected in small fractions, and the composition of the fractions was determined by infrared analysis.

Figure 3:
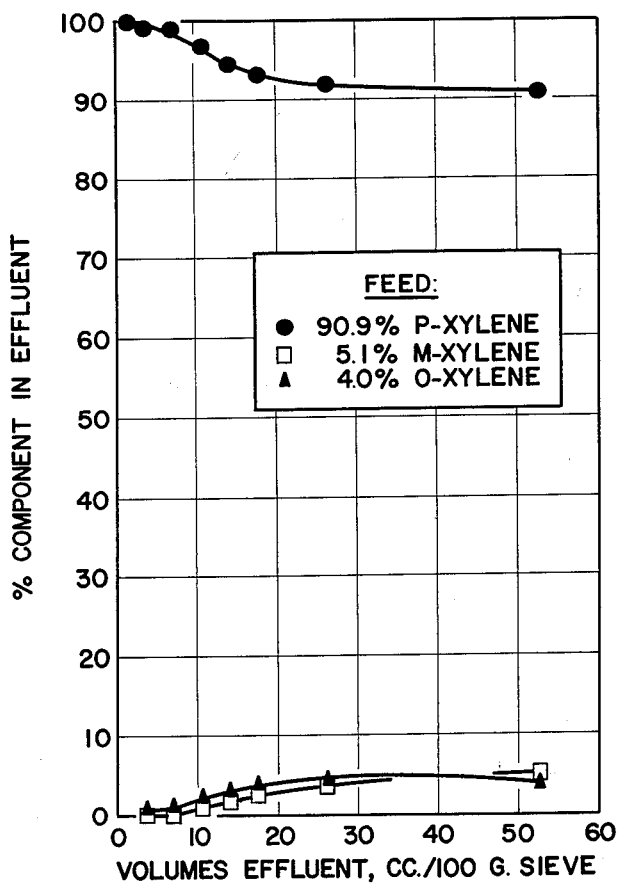

FIGURE 3 shows the results of this experiment. The composition of the individual fractions is plotted against the total volume of effluent expressed in cc./100 grams of sieve. Up to 10.5 cc. per 100 grams of sieve, the individual fractions contain p-xylene in a purity of 96.9% or greater. Expressing this information in a different manner, the capacity of the calcium-exchanged sieve is such that 1.13 gallons of over 98.7% pure p-xylene can be produced per 100 lbs. of adsorbent from a feed of this composition. It is obvious that p-xylene in a higher or lower state of purity can be obtained by increasing or decreasing, respectively, the ratio of amount of sieve to amount of feed.

In its broader aspects, the present invention also includes separating and resolving other mixtures of disubstituted aromatic isomers. These include the diethyl benzenes, dihalo benzenes, dinitro benzenes, the phthalic acids, benzene disulfuric acids and similar mixtures. These materials are frequently prepared in such a manner that a mixture of two or more of the isomers are obtained. Normally, it is very difficult to separate or isolate these compounds in a high degree of purity because of their similarity in physical and chemical properties.

What is claimed is:
1. An improved process for concentrating a para-xylene containing stream, which stream further contains at least one other isomeric xylene, which comprises passing said stream as a vapor into an adsorption zone, maintaining in said zone a bed of crystalline metallic alumino-silicate zeolite having uniform pore openings of 10–13 Angstrom units, adsorbing said isomer in said pores and withdrawing and recovering a stream substantially richer in para-xylene.

2. The process of claim 1 which comprises desorbing said zeolite and separately recovering a concentrate of said isomeric xylenes.

3. The process of claim 1 wherein said zeolite has an empirical formula

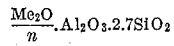

$$\frac{Me_2O}{n}.Al_2O_3.2.7SiO_2$$

wherein Me is a metal selected from groups I and II of the periodic table and $n$ is its valence.

4. The process of claim 3 wherein said metal is sodium.

5. The process of claim 3 wherein said metal is an alkaline earth metal.

6. The process of claim 3 wherein said metal is calcium.

7. An improved process for concentrating a para-xylene containing stream, which stream further contains at least one other isomeric xylene, which comprises passing said stream as a vapor into an adsorption zone, maintaining in said zone a bed of crystalline metallic alumino-silicate zeolite having uniform pore openings of 10–13 Angstrom units, contacting said stream with said zeolite and withdrawing and recovering an unadsorbed stream substantially richer in para-xylene.

8. An improved process for separating close boiling vaporizable aromatic isomers from their mixtures with one another which comprises passing a stream comprising said isomers as a vapor into an adsorption zone, maintaining in said zone a bed of crystalline metallic alumino-silicate zeolite having uniform pore openings of 7 to 13 Angstrom units, contacting said stream with said zeolite and withdrawing and recovering an unadsorbed stream substantially richer in one of said isomers.

9. An improved process for concentrating a disubstituted aromatic hydrocarbon containing stream, which stream further contains at least one other isomeric disubstituted aromatic hydrocarbon, which comprises passing said stream as a vapor into an adsorption zone, maintaining in said zone a bed of crystalline metallic alumino-silicate zeolite having uniform pore openings of 7 to 13 Angstrom units, contacting said stream with said zeolite and withdrawing and recovering an unadsorbed stream substantially richer in one of said disubstituted aromatics.

10. An improved process for concentrating a disubstituted benzene containing stream, which stream further contains at least one other isomeric disubstituted benzene, which comprises passing said stream as a vapor into an adsorption zone, maintaining in said zone a bed of crystalline metallic alumino-silicate zeolite having uniform pore openings of 7 to 13 Angstrom units, contacting said stream with said zeolite and withdrawing and recovering an unadsorbed stream substantially richer in one of said disubstituted benzenes.

11. An improved process for concentrating a dialkyl benzene containing stream, which stream further contains at least one other isomeric dialkyl benzene, which comprises passing said stream as a vapor into an adsorption zone, maintaining in said zone a bed of crystalline metallic alumino-silicate zeolite having uniform pore openings of 7 to 13 Angstrom units, contacting said stream with said zeolite and withdrawing and recovering an unadsorbed stream substantially richer in one of said dialkyl benzenes.

12. An improved process for concentrating a diethyl benzene containing stream, which stream further contains at least one other isomeric diethyl benzene, which comprises passing said stream as a vapor into an adsorption zone, maintaining in said zone a bed of crystalline metallic alumino-silicate zeolite having uniform pore openings of 7 to 13 Angstrom units, contacting said stream with said zeolite and withdrawing and recovering an unadsorbed stream substantially richer in one of said diethyl benzenes.

13. An improved process for concentrating a para-xylene containing stream, which stream further contains at least one other isomeric xylene, which comprises passing said stream as a vapor into an adsorption zone, maintaining in said zone a bed of crystalline metallic aluminosilicate zeolite having uniform pore openings of 7 to 13 Angstrom units, contacting said stream with said zeolite and withdrawing and recovering an unadsorbed stream substantially richer in para-xylene.

14. The process for treating a fluid mixture comprising at least two isomeric compounds selected from the class consisting of di-halo-benzenes, which process comprises contacting said mixture with a solid granular adsorbent consisting essentially of a partially dehydrated crystalline zeolitic sodium metallo alumino silicate having pores of substantially uniform diameter between about 7 A. and about 13 A. whereby there is obtained a rich adsorbent containing adsorbed components of said mixture and a fluid raffinate product comprising the non-adsorbed components of said mixture, and treating said rich adsorbent to remove said adsorbed components therefrom as a fluid extract product, the proportion of said isomers in said extract product being different from the proportion of said isomers in said raffinate product.

15. A process according to claim 14 wherein said adsorbent essentially comprises a zeolitic sodium alumino silicate having substantially uniform diameter pores of about 13 A.

16. A process according to claim 14 wherein said adsorbent essentially comprises a zeolitic calcium sodium alumino silicate having substantially uniform diameter pores of about 10 A.

17. A process as defined by claim 14 wherein said contacting and said treating are effected in the vapor phase.

18. A process as defined by claim 14 wherein said treatment of said rich adsorbent comprises contacting the same with a displacement exchange fluid which is readily separated from said extract product and said raffinate product.

19. A process according to claim 14 wherein said contacting and said treating are carried out at substantially the same temperature and pressure.

20. A process for treating a fluid mixture comprising at least two isomeric compounds selected from the class consisting of di-halo-benzenes, which process comprises: (1) contacting said mixture with a lean solid granular adsorbent consisting essentially of a partially dehydrated crystalline zeolitic metallo alumino silicate having pores of substantially uniform diameter between about 7 A. and about 13 A. whereby there is obtained a rich adsorbent containing adsorbed components of said mixture and a fluid raffinate product comprising the non-adsorbed components of said mixture; (2) contacting said rich adsorbent with a displacement exchange fluid whereby there is obtained a solid lean adsorbent containing adsorbed displacement exchange fluid and an extract fluid; (3) returning said lean adsorbent to step (1); (4) separately treating said extract and raffinate products to separate said displacement exchange fluid therefrom, the proportion of said isomers in said extract product being different from the proportion of said isomers in said raffinate product.

21. A process according to claim 20 wherein said adsorbent essentially comprises a zeolitic sodium alumino silicate having substantially uniform diameter pores of about 13 A.

22. A process according to claim 20 wherein said adsorbent essentially comprises a zeolitic calcium sodium alumino silicate having substantially uniform diameter pores of about 10 A.

23. A process as defined by claim 20 wherein in steps (1) and (2) said mixture and said displacement exchange fluid are contacted with said adsorbent in the vapor phase.

24. The process for treating a fluid mixture comprising at least two isomeric compounds selected from the class consisting of di-halo-benzenes, which process comprises: contacting said mixture with a solid granular adsorbent consisting essentially of a partially dehydrated crystalline zeolitic sodium metallo alumino silicate having pores of substantially uniform diameter between about 7 A. and about 13 A.; and separating the solid phase from the fluid phase, the proportion of said isomers in said solid phase being different from the proportion of said isomers in said fluid phase.

References Cited in the file of this patent

FOREIGN PATENTS 777,233    Great Britain _____ June 19, 1957

OTHER REFERENCES

"Physical Properties of Linde Molecular Sieves," Form 9947. Published by the Linde Company on August 19, 1957. Copy in 260—676MS.